United States Patent
Woehrle et al.

(10) Patent No.: US 10,727,472 B2
(45) Date of Patent: Jul. 28, 2020

(54) CATHODE, CATHODE-CONTAINING LITHIUM ION BATTERY IN THE STATE PRIOR TO THE FIRST CHARGING PROCESS, METHOD FOR FORMING A LITHIUM ION BATTERY, AND LITHIUM ION BATTERY AFTER FORMATION

(71) Applicant: Bayerische Motoren Werke Aktiengesellschaft, Munich (DE)

(72) Inventors: Thomas Woehrle, Munich (DE); Holger Hain, Ismaning (DE); Hideki Ogihara, Haimhausen (DE); Thorsten Langer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 127 days.

(21) Appl. No.: 15/467,080

(22) Filed: Mar. 23, 2017

(65) Prior Publication Data

US 2017/0194625 A1   Jul. 6, 2017

Related U.S. Application Data

(63) Continuation of application No. PCT/EP2015/069108, filed on Aug. 20, 2015.

(30) Foreign Application Priority Data

Sep. 25, 2014 (DE) .................. 10 2014 219 421

(51) Int. Cl.
*H01M 4/04* (2006.01)
*H01M 4/525* (2010.01)
*H01M 10/0525* (2010.01)
*H01M 4/131* (2010.01)
*H01M 4/1391* (2010.01)
*H01M 4/485* (2010.01)
*H01M 10/052* (2010.01)
*H01M 4/02* (2006.01)

(52) U.S. Cl.
CPC ......... *H01M 4/0447* (2013.01); *H01M 4/131* (2013.01); *H01M 4/1391* (2013.01); *H01M 4/485* (2013.01); *H01M 4/525* (2013.01); *H01M 10/052* (2013.01); *H01M 10/0525* (2013.01); *H01M 2004/028* (2013.01)

(58) Field of Classification Search
CPC .... H01M 4/62; H01M 4/362; H01M 10/0525; H01M 2004/021; H01M 2004/028
USPC ...................................... 429/231.3
See application file for complete search history.

(56) References Cited

U.S. PATENT DOCUMENTS

| | | | |
|---|---|---|---|
| 5,531,920 A | 7/1996 | Mao et al. | |
| 6,677,082 B2 | 1/2004 | Thackeray et al. | |
| 6,680,143 B2 | 1/2004 | Thackeray et al. | |
| 7,205,072 B2 | 4/2007 | Kang et al. | |
| 2013/0011752 A1 | 1/2013 | Tanaami et al. | |
| 2013/0078529 A1* | 3/2013 | Yang ................. | H01M 10/0567 429/326 |
| 2014/0099555 A1 | 4/2014 | Onizuka et al. | |
| 2014/0220426 A1 | 8/2014 | Chernyshov et al. | |

FOREIGN PATENT DOCUMENTS

| | | |
|---|---|---|
| CN | 103035979 A | 4/2013 |
| CN | 103474671 A | 12/2013 |
| DE | 10 2011 006 585 A1 | 1/2012 |
| DE | 10 2012 211 740 A1 | 1/2013 |
| DE | 10 2012 215 929 A1 | 3/2013 |
| JP | 2010225291 A * | 10/2010 |
| JP | 2014-78360 A | 5/2014 |
| JP | 2014-135287 A | 7/2014 |
| JP | 2014-149989 A | 8/2014 |
| JP | 2014-152174 A | 8/2014 |
| WO | WO 2012/092210 A1 | 7/2012 |

OTHER PUBLICATIONS

English translation of Isono, JP 2010225291 A, dated Feb. 2010, Japan.*
International Search Report (PCT/ISA/210) issued in PCT Application No. PCT/EP2015/069108 dated Oct. 23, 2015 with English translation (Six (6) pages).
German-language Written Opinion (PCT/ISA/237) issued in PCT Application No. PCT/EP2015/069108 dated Oct. 23, 2015 (Six (6) pages).
German-language Search Report issued in counterpart German Application No. 10 2014 219 421.0 dated Jul. 20, 2015 with partial English translation (Thirteen (13) pages).
Shanmukaraj et al., "Sacrificial Salts: Compensating the Initial Charge in Irreversibility in Lithium Batteries", Electrochemistry Communications 12 (2010) pp. 1344-1347.
Xu et al., "Recent Progress in Cathode Materials Research for Advanced Lithium Ion Batteries", Materials Science and Engineering R 73 (2012) pp. 51-65.
Zhang, "A Review of the Electrochemical Performance of Alloy Anodes for Lithium-Ion Batteries", Journal of Power Sources 196 (2011) pp. 13-24.
Tasaki et al., "Solubility of Lithium Salts Formed on the Lithium-Ion Battery Negative Electrode Surface in Organic Solvents", Journal of the Electrochemical Society, 156 (12), 2009, pp. A1019-A1027.

(Continued)

*Primary Examiner* — Brittany L Raymond
(74) *Attorney, Agent, or Firm* — Crowell & Moring LLP

(57) ABSTRACT

A cathode in a state prior to a first charging process is provided having an active cathode material and lithium peroxide. A lithium ion battery or an electrochemical cell includes the same cathode. A method is also provided for forming a lithium ion battery, and a lithium ion battery is provided which includes a cathode having an active cathode material, a separator, an anode having an active anode material, and an electrolyte, wherein after a formed cell is fully discharged, the active cathode material holds the same lithium content as before the formation process.

9 Claims, No Drawings

(56) References Cited

OTHER PUBLICATIONS

Ogasawara et al., "Rechargeable $Li_2O_2$ Electrode for Lithium Batteries", Journal of the American Chemical Society, American Chemical Society, US, vol. 128, No. 4, Feb. 1, 2006, pp. 1390-1393, XP002624171.

English translation of Japanese-language Office Action issued in counterpart Japanese Application No. 2017-514291 dated Mar. 20, 2019 (5 pages).

Japanese-language Office Action issued in Japanese Application No. 2017-514291 dated Jan. 29, 2020 with English translation (10 pages).

\* cited by examiner

CATHODE, CATHODE-CONTAINING LITHIUM ION BATTERY IN THE STATE PRIOR TO THE FIRST CHARGING PROCESS, METHOD FOR FORMING A LITHIUM ION BATTERY, AND LITHIUM ION BATTERY AFTER FORMATION

CROSS REFERENCE TO RELATED APPLICATIONS

This application is a continuation of PCT International Application No. PCT/EP2015/069108, filed Aug. 20, 2015, which claims priority under 35 U.S.C. § 119 from German Patent Application No. 10 2014 219 421.0, filed Sep. 25, 2014, the entire disclosures of which are herein expressly incorporated by reference.

BACKGROUND AND SUMMARY OF THE INVENTION

The present invention relates to a cathode in a state prior to a first charging (or formation) having an active cathode material and lithium peroxide, and a lithium ion battery including such cathode. The present invention also relates to a process for producing a lithium ion battery, and a lithium ion battery after formation.

The present invention further relates to a cathode having lithium peroxide ($Li_2O_2$), and a lithium ion battery including such cathode in a state prior to a first charging (or formation).

As used herein, the terms "lithium ion battery", "rechargeable lithium ion battery" and "secondary lithium ion battery" are used synonymously. These terms also encompass the terms "lithium battery", "lithium ion accumulator" and "lithium ion cell," and also all lithium or alloy batteries, in particular also Li sulfur and alloy systems. Thus, the term "lithium ion battery" is used herein as a collective term for the abovementioned terms customary known in the art. It refers to both rechargeable batteries (secondary batteries) and non-rechargeable batteries (primary batteries). In particular, as used herein, a "battery" within the meaning of the present invention also encompasses an individual or single "electrochemical cell".

Generally, as known in the art, the mode of action of a lithium ion battery can be described as follows: the electric energy is stored in lithium ions (at the negative electrode) and transition metal oxides (at the positive electrode) in a chemical process with a change of material. Here, lithium in ionized form ($Li^+$) can migrate back and forth through the electrolyte between the two electrodes. In contrast to the lithium ions, the transition metal ions present at the cathode are fixed in place.

This flow of lithium ions is necessary to compensate the external flow of electric current during charging and discharging, so that the electrodes themselves remain electrically neutral. During discharging, the effective lithium atoms (or the negative active material containing the lithium ions) each release an electron at the negative electrode and this electron flows via the external current circuit (load) to the positive electrode. At the same time, the same number of lithium ions migrates through the electrolyte from the negative electrode to the positive electrode. However, the lithium ions do not take up the electron again at the positive electrode but instead the transition metal ions present there take up the electrons. Depending on the type of battery, these can be cobalt, nickel, manganese, iron ions, etc. The lithium thus continues to be in ionic form ($Li^+$) at the positive electrode in the discharged state of the cell.

In general, lithium ion batteries are assembled or manufactured in the discharged state. That is to say, the cathode, e.g., $LiCoO_2$, is completely intercalated with lithium ions, while the anode, e.g., carbon, is completely empty (i.e., it is not loaded with lithium).

During first charging, also referred to as a formation process, the anode is polarized in the negative direction (i.e., electrons flow into the active anode material, e.g., carbon or graphite) and lithium cations leave the active cathode material of the cathode, enter the electrolyte and are intercalated into the active anode material with formal reduction.

The first charging process is particularly complex since many reduction reactions and decomposition reactions occur here. As a result, not only actual charging but also the formation of a solid electrolyte interphase ("SEI"), to which mainly reductive decompositions of a small amount of organic electrolyte are ascribed, occurs. The formation of the SEI layer is quite desirable since it counters further decomposition of the electrolyte and thus effectively acts as a protective layer around the particles of the active material in the negative electrode, by means of which important electrical properties such as life and cycling stability of the lithium ion battery can be optimized.

During formation, however, lithium is required and consumed for creating the SEI layer and this is later no longer available for cycling. The ratio of the first charge/discharge is referred to as formation loss and is about 10% when $LiCoO_2$ is used as the active cathode material and graphite is used as the anode material. Accordingly, the active cathode material as the sole source of lithium in a cell has to be over dimensioned by about 10% in this example. In the case of the active anode materials (e.g., silicon-based) being developed at present, the formation losses can even be more than 40%.

U.S. Pat. No. 5,531,920 provides a process for preparing $LiMnO_2$, in which the starting compound $Mn(OH)_2$ is oxidized by means of lithium peroxide ($Li_2O_2$). Since the lithium peroxide is completely reacted in this process, the end product no longer contains any lithium peroxide.

The document Electrochemistry Communications 12 (2010) 1344-1347 by D. Shanmukaraj et al. discloses a process in which nitrogen-based Li salts which are decomposed during formation are added to the cathode. However, such nitrogen-based salts can at least partly decompose in an uncontrolled manner as early as in the mixing process.

It is an object of the present invention to provide a lithium ion battery having an increased specific energy or energy density combined with lower production costs.

It is an object of the present invention to provide a cathode in a state prior to a first charging (or formation). The present invention also provides a lithium ion battery in a state prior to formation, and a process for forming a lithium ion battery. The present invention further provides a lithium ion battery in a state after formation.

The following definitions apply, where applicable, to all aspects according to the invention.

Lithium Ion Battery

As used herein, the term "lithium ion battery" is as defined above. In particular, the term also includes, according to the invention, an individual or single "electrochemical cell". In a "battery", two or more such electrochemical cells are preferably connected, either in series (i.e., after one another) or in parallel.

Electrodes

The electrochemical cell of the invention has at least two electrodes, i.e., a positive electrode (cathode) and a negative electrode (anode).

The two electrodes each have at least one active material. This is able to take up or release lithium ions and at the same time take up or release electrons.

As used herein, the term "positive electrode" means the electrode which is, when the battery is connected to a load, for example an electric motor, able to take up electrons. In this nomenclature, it represents the cathode.

As used herein, the term "negative electrode" means the electrode which is able to release electrons during operation. In this nomenclature, it represents the anode.

The electrodes include inorganic material or inorganic compounds or substances which can be used for or in or on an electrode or as electrode. These compounds or substances can take up (intercalate) lithium ions or metallic lithium and release them again under the operating conditions of the lithium ion battery due to their chemical nature. In the present description, such a material is referred to as "active cathode material" or "active anode material" or generally "active material". For use in an electrochemical cell or battery, this active material is preferably applied to a support, preferably to a metallic support, preferably aluminum for the cathode and copper for the anode. This support is also referred to as "power outlet lead" or as "collector" or "collector foil."

Cathode (the Positive Electrode)

As for the active material for the positive electrode or the cathode, it is possible to use active materials which are known in the art. These include but not limited to, for example, $LiCoO_2$ (LCO), lithium nickel cobalt manganese oxide (NCM), lithium nickel cobalt aluminum oxide (NCA), high-energy NCM (HE-NCM), lithium iron phosphate or Li-manganese spinel ($LiMn_2O_4$). According to one aspect of the present invention, any suitable active material known in the art can be used for the positive electrode (or the cathode).

In a preferred embodiment, active materials for the cathode can be selected from the group consisting of lithium-transition metal oxide ("lithium-metal oxide"), layered oxides, spinels, olivine compounds, silicate compounds and mixtures thereof. These active cathode materials are described, for example, in Bo Xu et al. "Recent Progress in Cathode Materials Research for Advanced Lithium Ion Batteries", *Materials Science and Engineering*, R 73 (2012) 51-65. Preferably, the cathode material is HE-NCM. Layered oxides and HE-NCM are described in the patent documents U.S. Pat. Nos. 6,677,082 B2, 6,680,143 B2, and 7,205,072 B2 of the Argonne National Laboratory.

Examples of olivine compounds are lithium phosphates of the empirical formula $LiXPO_4$ where X=Mn, Fe, Co or Ni, or combinations thereof.

Examples of lithium-metal oxide, spinel compounds and layered oxides are lithium manganite, preferably $LiMn_2O_4$, lithium cobaltate, preferably $LiCoO_2$, lithium nickelate, preferably $LiNiO_2$, or mixtures of two or more of these oxides, or mixed oxides thereof.

The active material can also contain mixtures of two or more of the substances mentioned.

To increase the electrical conductivity, further compounds, preferably carbon-containing compounds, or carbon, preferably in the form of conductive carbon black or graphite, can be present in the active material. The carbon can also be introduced in the form of carbon nanotubes. Such additions are preferably in an amount of from 0.1 to 6% by weight, more preferably from 1 to 3% by weight, based on the mass of the positive electrode applied to the support.

Anode (the Negative Electrode)

As for the active material for the negative electrode or the active anode material, it is possible to use active materials which are known in the art. According to one aspect of the present invention, any suitable active material known in the art can be used for the negative electrode (or the anode). Preferably, the active materials are partially lithiated, particularly preferable active materials are non-prelithiated.

The active material for the anode can be selected from the group consisting of lithium-metal oxides, such as lithium-titanium oxides, metal oxides (e.g., $Fe_2O_3$, ZnO, $ZnFe_2O_4$), carbon-containing materials such as graphite (e.g., synthetic graphite, natural graphite), graphene, mesocarbon, doped carbon, hard carbon, soft carbon, fullerenes, mixtures of silicon and carbon, silicon, lithium alloys and mixtures thereof. It is also possible to use niobium pentoxide, tin alloys, titanium dioxide, tin dioxide, and silicon as the active material for the anode (or the negative electrode).

In a preferred embodiment, the active anode material is a material which can be alloyed with lithium. This can be a lithium alloy or an unlithiated or partially lithiated precursor from which a lithium alloy is formed during formation. Preferred materials which are able to be alloyed with lithium are lithium alloys selected from the group consisting of silicon-based, tin-based and antimony-based alloys. These alloys are described, for example, in the article by W. J. Zhang, *Journal of Power Sources*, 196 (2011) 13-24.

Electrode Binder

The materials used for the positive electrode or for the negative electrode, for example the active materials, are held together by one or more binders which hold these materials on the electrode or on the power outlet lead.

The binders can be selected from the group consisting of polyvinylidene fluoride (PVDF), polyvinylidene fluoride-hexafluoropropylene copolymer (PVDF-HFP), polyethylene oxide (PEO), polytetrafluoroethylene, polyacrylate, styrene-butadiene rubber and carboxymethylcellulose (CMC) and mixtures and copolymers thereof. The styrene-butadiene rubber and optionally carboxymethylcellulose and/or further binders such as PVDF are preferably present in an amount of 0.5-8% by weight based on the total amount of the active material used in the positive or the negative electrode.

Separator

The electrochemical cell of the invention has a material which separates the positive electrode and the negative electrode from one another. This material is permeable to lithium ions, i.e., conducts lithium ions, but is a nonconductor for electrons. Such materials used in lithium ion batteries are also referred to as separators.

In a preferred embodiment of the present invention, polymers are used as separators. In one embodiment, the polymers are selected from the group consisting of: polyester, preferably polyethylene terephthalate; polyolefin, preferably polyethylene, polypropylene; polyacrylonitrile; polyvinylidene fluoride; polyvinylidene-hexafluoropropylene; polyether imide; polyimide, polyether; polyether ketone and mixtures thereof. The separator has porosity, so that it is permeable to lithium ions. In a preferred embodiment of the present invention, the separator consists of at least one polymer.

Electrolyte

As used herein, the term "electrolyte" refers to a liquid in which a lithium electrolyte salt has been dissolved. The liquid is preferably a solvent for the electrolyte salt. The Li electrolyte salt is then preferably present as electrolyte solution.

Suitable solvents are preferably inert solvents. Examples of suitable solvents include preferably organic solvents such as ethylene carbonate, propylene carbonate, butylene carbonate, dimethyl carbonate, diethyl carbonate, ethyl methyl carbonate, sulfolanes, 2-methyltetrahydrofuran and 1,3-dioxolane. Preference is given to using organic carbonates.

In one aspect of the present invention, the ionic liquids can also be used as solvents. The ionic liquids contain exclusively ions. Examples of cations include those which can, in particular, be alkylated, are imidazolium, pyridinium, pyrrolidinium, guanidinium, uronium, thiouronium, piperidinium, morpholinium, sulfonium, ammonium and phosphonium cations. Examples of anions which can be used are halide, tetrafluoroborate, trifluoroacetate, triflate, hexafluorophosphate, phosphinate and tosylate anions.

Examples of ionic liquids include but not limited to: N-methyl-N-propylpiperidinium bis(trifluoromethylsulfonyl)imide, N-methyl-N-butylpyrrolidinium bis(trifluoromethylsulfonyl)imide, N-butyl-N-trimethylammonium bis(trifluoromethylsulfonyl)imide, triethyl sulfonium bis(trifluoromethylsulfonyl)imide and N, N-diethyl-N-methyl-N-(2-methoxyethyl)ammonium bis(trifluoromethylsulfonyl)imide.

Preference is given to using two or more of the abovementioned liquids. Preferred electrolyte salts are lithium salts which have inert anions and are preferably nontoxic. Suitable lithium salts are preferably lithium hexafluorophosphate (LiPF$_6$), or lithium tetrafluoroborate (LiBF$_4$) and mixtures of one or more of these salts. In one embodiment, the separator is impregnated or wetted with the lithium salt electrolyte.

Various objects, advantages and novel features of the present invention will become apparent from the following detailed description of one or more preferred embodiments.

In one aspect of the present invention, the invention is directed to a cathode in a state prior to a first charging process (or formation process) having an active cathode material and lithium peroxide.

According to one aspect of the present invention, the cathode contains lithium peroxide (Li$_2$O$_2$).

The lithium peroxide serves to compensate formation losses and is therefore preferably added in an amount that matches to the anode on installation in an electrochemical cell. In contrast to the invention, the lithium peroxide used in conventional art oversizes the cathode material to compensate for the formation losses. In the case of the lithium ion batteries used in the conventional art, a solid phase which does not contribute to the capacity remains in the cathode after formation. Since, according to the invention, active cathode material is replaced, in comparison with the conventional art, by less expensive and lighter lithium peroxide (Li$_2$O$_2$) in the cathode, the cathode according to the invention is less costly and has a higher specific capacity compared to those used in the conventional art. In addition, lithium peroxide has a lower molar mass compared to known active cathode materials, based on the equivalent molar amount of lithium. Thus, the cathode has, even in the state prior to first charging, a lower weight per unit area compared to those cathodes used in the conventional art. This effect is reinforced further by the formation of the lithium cell, since the lithium peroxide decomposes according to the following reaction equation during formation:

$$Li_2O_2 \rightarrow 2Li^+ + 2e^- + O_2 \text{ (gas)}$$

The lithium formed in this way can then, e.g., in a layer formed on the anode during formation, react according to the following reaction equation (as described by Tasaki et al., *J. Electrochem. Soc.*, 2009, 156, 12, A1019-A1027):

$$ROCO_2R + 2Li^+ + 2e^- \rightarrow 2LiOR + CO \text{ (gas); or}$$

$$2(CH_2)_2CO + 2Li^+ + 2e^- \rightarrow (CH_2OCO_2Li)_2 + C_2H_4 \text{ (gas)}$$

The oxygen gas from the decomposition of the lithium peroxide can be removed together with the other gases involved during formation from the lithium ion battery. Methods of removing gases which are formed during formation are well known in the art.

The cathode according to the present invention is particularly suitable for use together with active anode materials which display high formation losses. Such materials are shown in Table 1 below:

TABLE 1

| Typical formation losses for various anode active materials: | |
|---|---|
| Material | Formation losses; approximate figures |
| Synthetic graphite | 6-8% |
| Natural graphite | 8-12% |
| Soft carbon | 12-20% |
| Hard carbon | 15-25% |
| Si—C blend comprising 10% of Si | 15-20% |
| Si—C blend comprising 20% of Si | 20-25% |
| Si—C blend comprising 50% of Si | 30-40% |
| Pure silicon | 50% |

The cathode according to the present invention is also particularly suitable for use with the abovementioned lithium alloys which are described in the article W. J. Zhang, *Journal of Power Sources*, 196 (2011) 13-24. The commercial use of these alloys has hitherto been limited by, in particular, the high irreversible capacity loss (formation loss).

The cathode according to the present invention can include the lithium peroxide as a mixture with the active cathode material or in separate regions of the cathode. For example, it is also possible to apply the lithium peroxide as a covering layer to the active cathode material.

The cathode of the present invention preferably includes the lithium peroxide as a mixture with the active cathode material. In this way, the porosity of the cathode can be increased by the oxygen gas evolved in the decomposition of the lithium peroxide during formation. The increased porosity of the cathode has a favorable effect on the wetting by electrolyte, life and loading capability of the cathode.

The proportion of lithium peroxide based on the lithium content of the active cathode material is preferably from 1 to 60 mol %, more preferably from 1 to 50 mol %, particularly preferable, from 2 to 35 mol %.

The mixture preferably further includes a binder and electrical conductivity additive.

In another aspect, the present invention provides a lithium ion battery in a state prior to a first charging (or formation) which includes a cathode in a state prior to a first charging (or formation) having an active cathode material and lithium peroxide, a separator, an anode and an electrolyte.

The anode preferably includes an active anode material selected from the group consisting of carbon, graphite, mixtures of silicon and carbon, mixtures of silicon and graphite, mixtures of silicon, carbon and graphite, silicon, lithium-metal oxide, materials which are able to be alloyed with lithium, and mixtures thereof.

The amount of lithium peroxide is preferably selected such that the expected formation loss is compensated at least partly on a cell level, preferably substantially completely on a cell level.

The electrolyte preferably includes at least one constituent which decomposes during formation and contributes to a buildup of the solid electrolyte interphase (SEI). Examples of constituent include organic carbonates.

The lithium ion battery according to the present invention can be produced by processes known in the art using a cathode according to the present invention.

The electrodes and the separator are preferably manufactured together so as to give an electrode-separator assembly.

In another aspect, the present invention provides a process for forming a lithium ion battery, which includes providing a lithium ion battery in a state prior to formation that includes a cathode in a state prior to a first charging (or formation) having an active cathode material and lithium peroxide, a separator, an anode, and an electrolyte; and carrying out at least one charging operation to the maximum permitted upper voltage or operating voltage of the lithium ion battery.

In yet another aspect, the invention provides a lithium ion battery which includes a cathode having an active cathode material, a separator, an anode having an active anode material and an electrolyte, wherein the active cathode material still holds the same lithium content after complete discharge of the cell, preferably to 0 V, as compared to a state prior to formation. The lithium content can be determined by, for example, detachment of the active material from the power output lead and elemental analysis by means of ICP-OES.

Since the cathode material used in the lithium ion battery can typically be determined by a person skilled in the art, the person skilled in the art can calculate back the above reference point "state prior to formation" without having to examine the battery prior to formation. The transition metal: Li ratio depends on the material actually used. The determination of the actual active material can be carried out by a person skilled in the art using a combination of various known analytical methods.

The active cathode material is preferably selected from the group consisting of lithium-metal oxide, coated oxides, spinels, olivine compounds, silicate compounds and mixtures thereof.

The active anode material is preferably selected from the group consisting of graphite, carbon, mixtures of silicon and carbon, mixtures of silicon and graphite, mixtures of silicon, carbon and graphite, silicon, lithium-metal oxide, materials which are able to be alloyed with lithium, and mixtures thereof.

In the present invention, particular preference is given to using a cathode in which the lithium peroxide is present as a mixture with the active cathode material.

The following example according to the present invention is compared to an example using a conventional cell (comparative example). In each case, the following values are used:

Molar mass of $LiCoO_2$=97.87 g/mol, molar mass of $Li_2O_2$=45.88 g/mol.

Comparative example (e.g., using a commercially available cell):

The electrochemical cell according to the comparative example has a formation loss of 12% and a nominal capacity of 60 mAh (1 C, 2.8-4.2 V).

$LiCoO_2$ (KD10, Umicore) vs. natural graphite (B.T.R.).

Weights per unit area: cathode=15 $mg/cm^2$, anode=7 $mg/cm^2$

That is to say, 12% of the usable lithium (since charging (taking out of Li) is only possible to $Li_{0.5}CoO_2$, which then corresponds to only 6% of the total Li present) of the cathode ($LiCoO_2$) are consumed irreversibly.

Formation (first charging) was carried out at a rate of C/5=12 mA.

The electrochemical cell was produced as follows:

A mixture of 90 g, 5 g, 5 g of $LiCoO_2$, conductivity additive (Super P®) and polyvinyl difluoride (PVDF) is suspended in 100 g of N-methyl-2-pyrrolidone (NMP) at 20° C. using a mixing device providing high shear. This gives a homogeneous coating composition which is applied by doctor blade to a 20 μm aluminum support. After taking off the NMP, a cathode film having a weight per unit area of 15 $mg/cm^2$ is obtained. This is built into a cell using an anode with 7 $mg/cm^2$ (1% by weight of conductivity additive (Super P®)), 1% by weight of carboxymethylcellulose (CMC), 2% by weight of styrene-butadiene rubber (SBR), 96% by weight of natural graphite (from BTR), Celgard® 2500 separator, (25 μm) and an electrolyte composed of a 1 M solution of $LiPF_6$ in ethylene carbonate (EC)/diethylene carbonate (DEC) (3:7) (packaging aluminum composite film). The cell is charged for the first time up to 4.2 V (C/5) and subsequently discharged at C/2 to 2.8 V. First charging 68 mAh; first discharging 60 mAh; a formation loss of about 12% results.

An example according to the present invention:

Replacement of 12% $LiCoO_2$ by a Li equivalent amount of $Li_2O_2$.

Correspondingly adapted weight per unit area.

A mixture of 79.2 g of $LiCoO_2$, 2.53 g of $Li_2O_2$ (Rockwood Lithium), 5 g of Super P® and 5 g of PVDF is suspended in 100 g of NMP at 20° C. using a mixing device providing high shear. This gives a homogeneous coating composition which is applied by doctor blade to a 20 μm aluminum support. After taking off the NMP, a cathode film having a weight per unit area of 13.8 $mg/cm^2$ was obtained (here, it was taken into account that part of the $LiCoO_2$ has been replaced by $Li_2O_2$). This is built into a cell using an anode with 7 $mg/cm^2$ (1% of Super P®, 1% of CMC, 2% of SBR, 96% of BTR natural graphite), Celgard® 2500 separator, (25 μm) and an electrolyte composed of a 1 M solution of $LiPF_6$ in EC/DEC (3:7) (packaging aluminum composite film). The cell is charged for the first time to 4.2 V (C/5) and subsequently discharged at C/2 to 2.8 V. First charging 69 mAh; first discharging 60 mAh; a formation loss of about 13% results.

Similar behavior is thus observed in both cases. This shows that it is possible to compensate formation losses by means of comparatively less expensive and light lithium peroxide ($Li_2O_2$).

The above description of the present invention serves only for illustrative purposes and not for the purpose of restricting the invention. Various alterations and modifications are possible within the framework of the invention, without going outside the scope of the invention and its equivalents.

What is claimed is:

1. A process for forming a lithium ion battery, the process comprising the steps of:
   providing a lithium ion battery comprising:
   a cathode in a state prior to a first charging process or formation having an active cathode material and lithium peroxide, wherein an amount of the active cathode material is replaced with an amount of the lithium peroxide on installation such that the total weight per unit area of the cathode is lowered and wherein the amount of the lithium peroxide, based on the lithium content of the active cathode material, is from 1 to 60 mol %, a separator, an anode having an anode active material, and an electrolyte; and carrying out at least one first charging operation to the maximum operating voltage of the lithium ion battery with a decomposition of the lithium peroxide.

2. The process according to claim 1, wherein the active cathode material and the lithium peroxide have been mixed.

3. The process according to claim 2, wherein the mixture further comprises a binder and an electrical conductivity additive.

4. The process according to claim 1, wherein the active cathode material is selected from the group consisting of: lithium-metal oxide, layered oxides, spinels, olivine compounds, silicate compounds, high energy lithium nickel cobalt manganese, and mixtures thereof.

5. The process according to claim 1, wherein the active anode material is selected from the group consisting of: carbon, graphite, mixtures of silicon and carbon, silicon, lithium-metal oxide, materials which are able to be alloyed with lithium, and mixtures thereof.

6. The process according to claim 1, wherein the amount of lithium peroxide present can partially compensate for the formation loss of lithium ions.

7. The process according to claim 1, wherein the amount of lithium peroxide present can completely compensate for the formation loss of lithium ions.

8. The process according to claim 1, wherein the electrolyte contains at least one constituent which is decomposed during formation and contributes to buildup of an insoluble solid boundary protection layer on the anode.

9. The process according to claim 1, wherein after discharging, the active cathode material holds the same lithium content as before formation.

* * * * *